PROCESS FOR FORMING AN INSULATION BACKED WIRING PANEL

Filed Sept. 21, 1955 2 Sheets-Sheet 1

INVENTORS
RICHARD M. BELL
ATHAN STOSUY
BY
Alvin J. Riddles
AGENT

INVENTORS
RICHARD M. BELL
ATHAN STOSUY
BY Alvin J. Riddles
AGENT

United States Patent Office 2,925,645
Patented Feb. 23, 1960

2,925,645

PROCESS FOR FORMING AN INSULATION BACKED WIRING PANEL

Richard M. Bell, Poughkeepsie, and Athan Stosuy, Glenham, N.Y., assignors to International Business Machines Corporation, New York, N.Y., a corporation of New York Application September 21, 1955, Serial No. 535,566

4 Claims. (Cl. 29—155.5)

This invention relates to electrical conductors mounted on an insulating backing and more particularly to wiring of this type that is mechanically bonded to the insulating support.

The conductor of this invention is fastened to a supporting backing by portions of material that are part of the conductor and which mechanically retain the conductor in position on the support. By fastening the conductor to the backing in this manner a very strong bond is acquired and this bond permits the use of manufacturing operations that heretofore have been too rough for the purely adhesive type of bonds employed in similar applications such as in printed wiring. The mechanical bond and the manufacturing operations available for use with it makes possible the formation of a conductor mounted on an insulating backing wherein the bond to the insulating backing and all the operations of the manufacturing process are purely mechanical as contrasted with chemical or electro-chemical operations such as etching or plating.

In brief, what has been discovered is that a printed wiring conductor may be bonded to a thermosetting or thermoplastic insulating backing with a very strong mechanical bond by providing the conductor with a surface having particles fixed thereto and embedded in the insulating backing. The particles are so shaped that their transverse dimensions at points spaced from the conductor surface are greater than at the surface, and, when embedded in an insulating backing, the bond is such that the force required to delaminate the conductor must be sufficient at each particle to either strip the particle from the conductor or fracture the insulating backing. A printed wiring conductor provided with such a bond may then be subjected to machining operations that heretofore have been too rough for reliable printed wiring forming procedures and, in turn, the availability of such machining operations permits great simplification in die manufacture for embedding this type of conductor to a backing material.

It should be noted that the term printed wiring used in the description of this invention is employed only as a general term established in the art defining an electrical conductor mounted on an insulating backing and is not used descriptively since the operation of printing is not employed.

A primary object of this invention is to provide a mechanically bonded printed wiring conductor.

Another object of this invention is to provide a method of manufacturing a printed conductor wherein all operations are purely mechanical.

Still another object of this invention is to provide a printed conductor that is flush with the insulating backing and mechanically bonded to that backing.

A related object is to provide a printed wiring board with flush, mechanically bonded, circuit patterns on both sides having conductive conections through the board that are mechanically bonded to the insides of the holes.

Other objects of the invention will be pointed out in the following description and claims and illustrated in the accompanying drawings, which disclose, by way of example, the principle of the invention and the best mode, which has been contemplated, of applying that principle.

Figure 1:
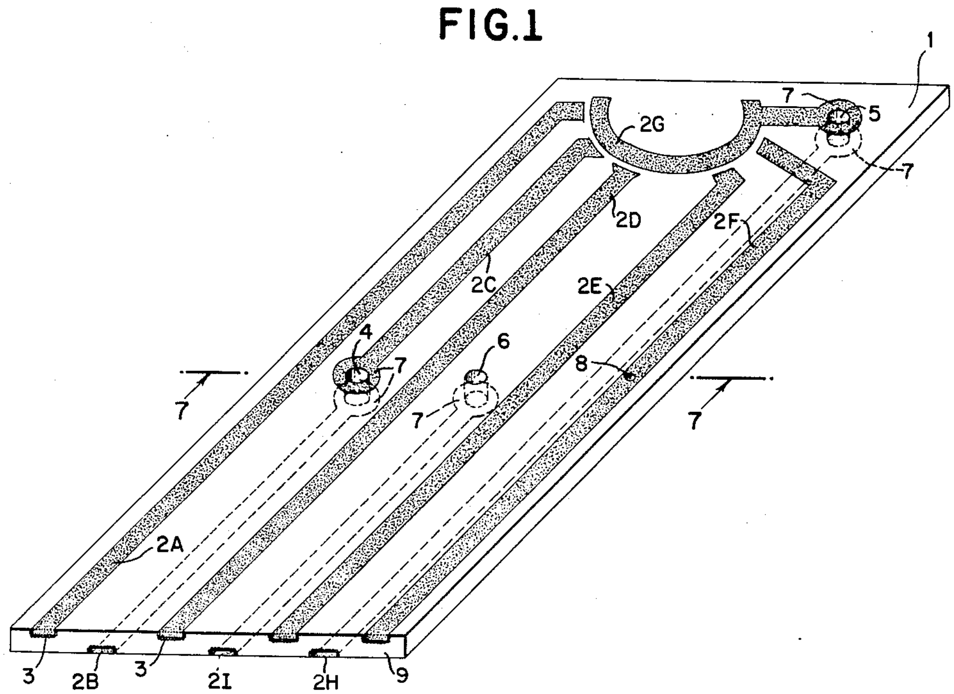
Figure 1 is a perspective view of a printed wiring commutator panel made by the process of this invention.

Referring now to Figure 1 there is shown a perspective view of a printed wiring commutator board or panel selected to illustrate the electrical conductor, its manner of application, and the adaptation to this type of conductor of some of the standard practice constructional techniques used in the art. The commutator board of Figure 1 is made up of an insulating backing 1 of thermosetting or thermoplastic material having conductors 2A through 2I embedded in its surfaces and mechanically bonded through particles 3 to the insulating material 1. Conductive connections 4, 5 and 6 are provided through the insulating backing 1 as shown. Surrounding conductive connections 4 and 5 on each side of the insulating backing 1 and on the lower side of the backing 1 surrounding connection 6 are terminal portions 7 provided for purposes well known in the art. It should be noted that where the conductor pattern is crowded, no terminal portion need be used with the conductively lined holes as is shown by hole 6. A commutator layout is illustrated comprising as the common portion conductor 2G and as individual segment portions the conductors 2A, 2C, 2D, 2E and 2F. The conductor 2F is shown anchored at one point to prevent vertical and lateral delamination, by an anchor pin 8 which is formed along with the conductor pattern. The conductors 2A, 2B, 2D, 2E, 2F, 2H and 2I are shown provided with straight portions at one edge 9 of the insulating backing 1 to provide pluggable contact into a suitable receptacle in a manner well established in the art.

The printed wiring board of Figure 1 may be formed by first providing a sheet of conductive material that is to serve as the conductors having one surface coated with particles bonded to the conductive material. A view of the foil with the particles on one surface is provided in Figure 2 wherein a conductive foil 2 is shown with particles 3 bonded to it. The particles 3 may be of varying size and in general their diameter should be within a few orders of magnitude of the foil thickness. This requirement is not rigid but a uniform particle coating facilitates a die manufacturing operation to be later described. For this reason, where the particles are of varying size or the coating not uniform, it is sometimes convenient to roll the coated foil between spaced rollers to establish a definite size. The method of attaching the particles 3 to the foil 2 will vary with the materials used. If the particles are of some material, for example emery dust, and the foil is, for example, copper, the particles may be firmly attached to the foil with a cement. It should be noted that there is complete freedom at this stage of manufacture to employ any cement curing operation that the foil and particles can stand. If the particles are of metal they may be bonded to the foil by alloying or sintering. The technique of sintering has been found to be very satisfactory and is accomplished by coating a foil with a fine metal powder and then heating at a temperature sufficient to sinter the powder particles to the foil. Using a copper foil 0.003 inch in thickness and a copper powder, the particles of which are approximately .001 inch in diameter, sintering at 1970° F. for one hour produces a satisfactory coating. The nature of the bond between the particle and the foil received by sintering is well known and results in a product in which each particle is in effect welded to the foil sheet while still retaining its original shape and dimensions. One of the advantages of this type of bonding mechanism is that, when desired, the particles can be of the same chemical analysis as the foil. This results in no change in the electrical, chemical or physical properties of the foil as a result of the bonding. Hence, as may be determined from the above discussion, the particles forming the coating and their method of application may vary over a wide range. It is important only that the individual particle of the coating be firmly bonded to the foil over an area of its surface, which area is smaller than the general cross sectional area of the particle. If for example the particles were spheres, the diameter of the part of the sphere bonded to the foil should be less than the main diameter of the sphere. If it is convenient for a later automatic assembly step to have a particle coating on both sides of the foil, both sides may be coated at once and a machining step to be described later can remove the coating from the exposed surface of the conductor.

In the event that it is desirable for the conductors of the printed wiring board being manufactured to be coated or otherwise treated it is advantageous to accomplish such treatment of the foil at this stage of the process either before or after applying the particle coating depending on the nature of the treatment. For example, if for corrosion protection and dip soldering purposes a coating of solder over the conductors of the final product is desired, it is best applied to the foil at this time. If, for example, sintering is used the solder will not stand the sintering temperature and hence it is best to sinter first and then, protecting the particle coating, apply the solder to the opposite side of the foil using a rolling or dipping technique. Taking as a specific example the panel of Figure 1 it would very likely be desirable to have the conductors that are to form the commutator coated with Rhodium or some equally hard material. Such a coating could readily be applied by plating before the particles are applied. Techniques to provide a foil with a coating of particles on one side and a coating or combination of coatings of special surface materials on the opposite side may readily be devised by one skilled in the art.

Figure 3:
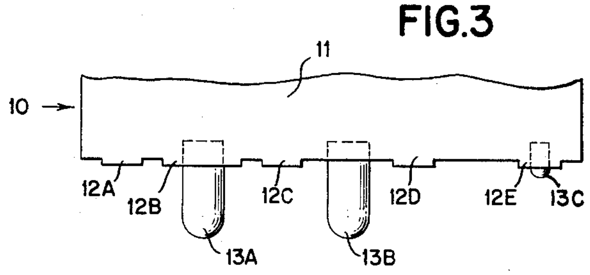
Figure 3 is an end elevational view of a portion of a die capable of forming the upper circuit pattern of the panel in Figure 1.

A die is next provided to form the circuit pattern in a molding operation. The die is constructed in such a manner that the areas to form circuit patterns are raised above the surface of the die. A die capable of forming the conductors of the upper wiring pattern of the panel of Figure 1 is shown in Figure 3. This die is shown in cross section on a line corresponding to the line 7—7 of Figure 1 and the impressions shown are those that would form the conductors at that point. Some exaggeration of the depth and sharpness of the impressions of the die has been used to provide detail.

Referring now to Figures 1 and 3 a die 10 is shown comprising a body material for example of steel. Raised portions 12A through 12E are provided to one surface of the die 10 to produce circuit bearing areas in the printed wiring panel to be formed. In this example, portion 12A will form conductor 2A in Figure 1, 12B will form the terminal portion 7 around hole 4, 12C will form conductor 2D, 12D will form conductor 2E and 12E will form conductor 2F. Pins 13A and 13B are provided to form conductive connections in holes 4 and 6 and pin 13C is provided to produce anchor pin 8.

Figure 4:
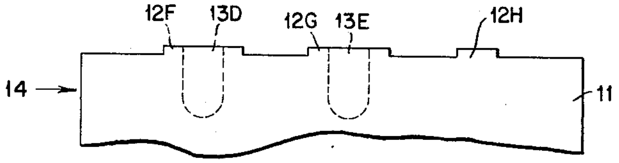
Figure 4 is an end elevational view of another die portion capable of forming the lower circuit pattern of Figure 1.

A similar die is shown in Figure 4 for providing the circuit pattern on the lower side of the printed wiring panel of Figure 1. Referring now to Figures 1 and 4 a die 14 is provided comprising a body material on which there are raised portions corresponding to the conductors on the lower side of the panel of Figure 1. Portions 12F, 12G and 12H form conductors 2B, 2I and 2H respectively and openings 13D and 13E correspond with pins 13A and 13B respectively to form and provide foil linings in conductive connection holes 4 and 6.

The dies 10 and 14 of Figures 3 and 4 may be made by any technique standard in the art. For example, one method of making such a die would be to apply an acid resist to the area to become raised portions and immerse the die in an acid until the area between the raised portions is eroded to the proper depth. Another example would be the technique of sandblasting through a stencil. The edges of the die impressions need not be sharp since, as will be apparent from later description, the die merely establishes a difference in level of different areas of a surface and performs no shearing action. The surface of the die between the raised portions may be in any condition as the molded material that will enter here will subsequently be removed. The height of the raised portions of the die should not be less than the combined thickness of the foil and the particles. The reason for this will be explained in connection with a machining operation later. It may be noted that due to this requirement, as described earlier, it is advantageous to have a uniform thickness to the particle and foil combination since the minimum depth of the impression of the die is governed by this dimension. For a specific example using copper foil 0.003 inch thick having a coating of copper powder particles approximately 0.001 inch thick, a die having raised portions approximately .006 inch in height is satisfactory.

Figure 2:
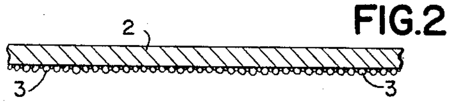
Figure 2 shows a cross sectional view of a piece of foil to which has been attached a coating of small particles.
Figure 5:
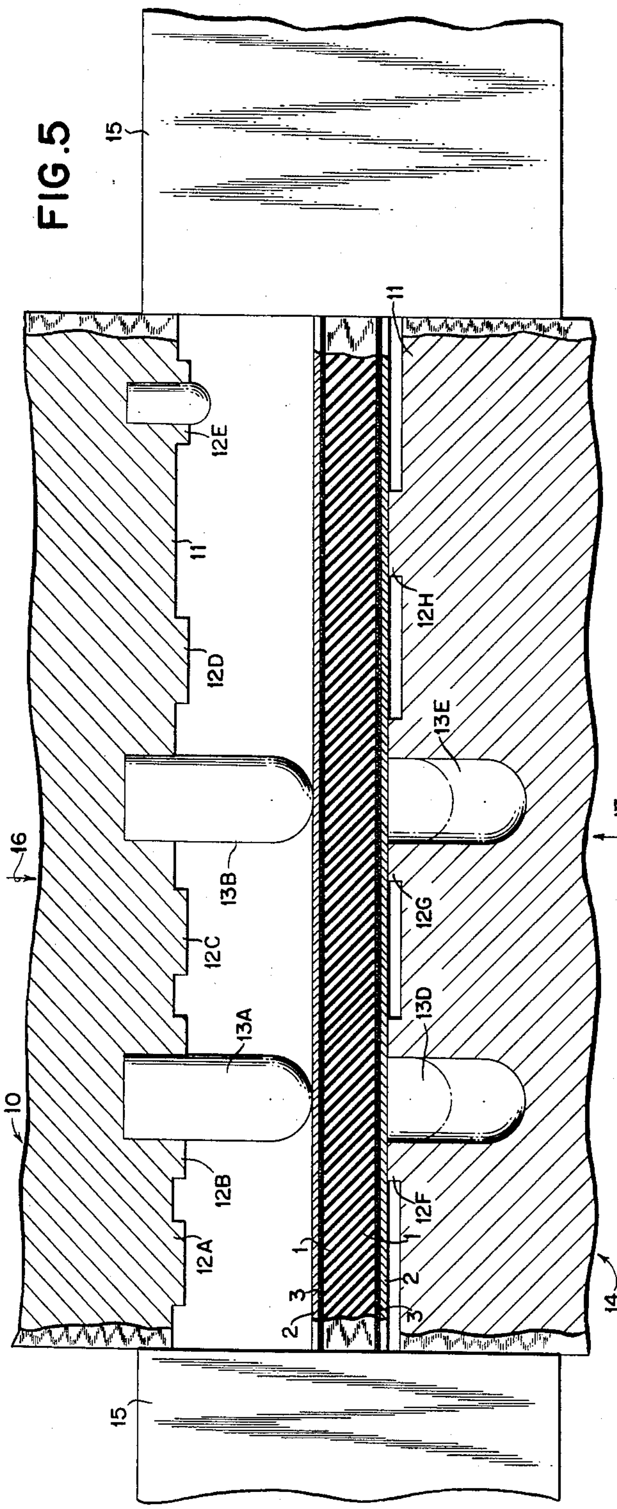
Figure 5 is a cross sectional view showing the dies in position to operate on the panel of Figure 1.

The coated foil is next bonded to an insulating backing material in a pressure molding operation so that the areas to become conductors are pressed below the surface of the insulating material. The pressure molding operation is shown schematically in Figure 5 for the formation of the printed wiring panel of Figure 1. Referring now to Figure 5 a die mounting support 15 is shown. Die 14 is placed in the support 15 with the circuit forming portions facing upward. A sheet of coated foil 2 as shown in Figure 2 is placed on the die 14 with the particles 3 away from the die. A quantity of insulating backing material 1 is next placed on the particle surface of the foil 2. The material 1 may be either thermosetting or thermoplastic molding material. Convenient forms are semi-cured sheet form, as shown, or in loose granules. The terms thermosetting or thermoplastic encompass a wide range of materials including nearly every temperature and pressure moldable material. A few specific examples of this group include nearly all synthetic resins, glass, ceramics, glass bonded mica and multiple layer plastic laminates. Over the material 1 a second layer of foil 2 is placed with the particle 3 side next to the material 1. The die 10 is then placed in the support 15 with the circuit forming portions next to the foil 2. Heat and pressure, as required for the type of material 1 being used, are applied to the dies 10 and 14 with arrows 16 and 17 indicating the directions of force. The heat and pressure causes the foil and the insulating material to conform to the impressions of the dies, forces the insulating material 1 to flow around each particle 3 on the foil 2 and moves the dies toward each other so that the pins form holes and depressions in the insulating material and carry the foil into those holes and depressions where it is bonded to the sides of the openings. While the above process has been described in connection with a single molding technique it should be understood that the process may be performed equally well with all molding techniques, injection and plunger molding being examples.

Under the influence of the heat and pressure the thermosetting or thermoplastic material 1 is made to flow in contact with the surface of the foil 2 surrounding each particle 3 so that a bond is acquired whereby the backing material has molded into its surface many tiny protruding portions of the conductive material each protruding portion of which has a larger dimension beneath the surface of the backing material than it has at the surface. Thus with the particle coating on the conductor material and the insulating backing material made to flow around each particle the backing material goes interstitially between the particles, envelopes each one and produces a purely mechanical bond that requires the stripping of each particle from the conductive material or the fracturing of the backing to separate. It is to be noted that because the largest dimension of each particle is beneath the surface of the backing material the mechanical bond achieved will resist delaminating forces in both lateral and vertical directions. This may be contrasted with surface roughening in that the surface area is increased and a mechanical bond is acquired in a lateral direction only with no provision to resist vertical delaminating force components.

Figure 6:
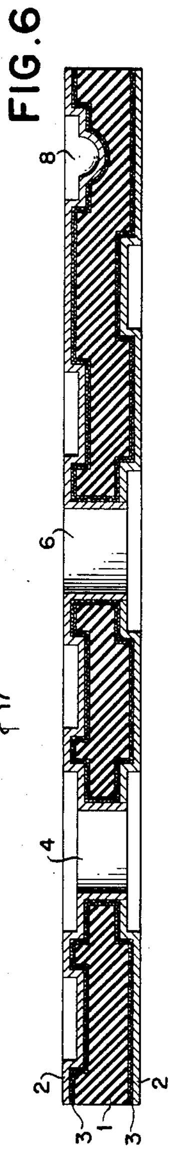
Figure 6 shows the panel after it has been operated on by the dies in Figure 5.

When the proper heat and pressure cycle for the particular insulating material used has been completed the molded printed wiring panel as formed thus far is removed from the mold. Referring now to Figure 6 a cross sectional view of the molded panel of Figure 1 taken along the line 7—7 is shown. After molding, the insulating backing 1 has conformed to the dies used and now grips each particle 3 on the back of the foil 2 so that the foil covering the surfaces is mechanically bonded to the insulating backing 1 at all points. In this view, the foil 2 is shown passing completely through the holes 4 and 6. It will be apparent that this takes place only for a range of dimensions in which the diameter of the hole is large enough to provide sufficient metal to line the hole through the thickness of the insulating backing. Some metal will be extruded by the action of the pin in punching the hole and shaping the foil and this also assists in covering the hole surface. It has been found generally that a relationship of hole diameter to backing thickness of about two to one, in other words a hole diameter approximately twice the thickness of the insulating backing will provide a continuous conductive connection through the hole. In applications where the thickness of the backing exceeds the hole diameter this process will provide linings in the hole so far as the metal of the foil extends so that connections in the hole and continuity through the hole may readily be established through a wick action in connection with a dip soldering operation wherein two adjacent surfaces are provided through the hole to support capillary action of the solder. An alternate method of hole formation with conductive lining would be to mold inserts at selected points. Since the insulating material is fluid during molding the insert will be securely fastened in the backing and can be made to intersect wiring patterns on both sides of the board.

Figure 7:
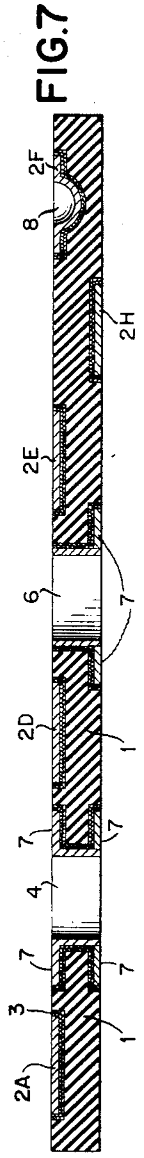
Figure 7 is a cross sectional view of the finished panel taken on the plane of the line 7—7 of Figure 1.

The final step in the production of a printed wiring board by this process involves the removal of the foil and insulating material raised above the surface into which the conductors are embedded. When the printed wiring panel was molded, the dies pressed the areas of foil to become conductors below the surrounding areas so that now a removal operation that will remove the material from those surrounding areas down to the surface of the part of the foil serving as conductors will separate the conductive areas from the non-conductive areas and will yield a flush circuit pattern. Since the foil is mechanically bonded to the backing, this bond is sufficiently reliable that any method of removal will suffice, and inadvertent forces applied to the conductors will not damage them. Mechanical methods of removal have been found preferable because of their economy and the absence of after effects such as deterioration of the electrical properties of the insulating backing due to immersion in a chemical bath. Machining operations such as grinding, planing, shaping and standing have been found to satisfactorily remove the material. Referring now to Figure 7 a view of the finished example panel of Figure 1 taken along the line 7—7 is shown wherein all conductors are shown separated electrically by intervening areas of insulating material 1 and all conductive areas are bonded to the insulating backing 1 at every point by the particles 3 embedded in the backing.

The machining operation should continue until all embedded particles are removed from the insulating areas between the conductive areas, if the particles are conductors. Hence, in order to be able to accomplish this without removing some of the material to serve as conductors, the die impressions should be deep enough to place the conductive areas sufficiently far below the areas to be removed. Hence an optimum relationship would be to save a uniform combined particle and foil thickness and a die the impressions of which are only slightly deeper than this thickness so that all of the foil and particles between conductors could be removed by machining without removing some of the conductor material and, at the same time excessive material would not have to be removed in order to get a flush pattern.

What has thus far been described is a mechanically attached electrical conductor and a process for forming that electrical conductor in place on an insulating backing. The process has been shown in detail as applied to a particular printed wiring panel which has been selected to illustrate the formation of many printed wiring board features employed in the art, it being believed that from the above teaching the conductor of this invention may be applied to any printed wiring configuration.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A process for forming an insulating backed wiring panel comprising the steps of providing a sheet of metal having a coating of particles bonded to at least one side whereby each particle of said coating is bonded to said metal over an area which is less than the maximum cross-sectional area of the particle parallel to said metal surface, providing a die having a representation of wiring embossed on a surface, placing a quantity of thermally and pressure influenced insulating material in contact with said particle coating of said sheet of metal, placing said die in contact with said sheet of metal on the side opposite to the side in contact with said insulating material, applying heat and pressure sufficient to impress said embossed wiring pattern into said metal and insulating material and to cause said insulating material to envelope each particle of said coating and removing all material above the surface of said wiring pattern.

2. A process for forming an insulation backed wiring panel comprising the steps of sintering a coating of copper powder on a sheet of copper foil, placing a quantity of thermally and pressure influenced insulating material in contact with said coating, pressing said foil backed by said insulating material against a die surface having embossed thereon a wiring pattern and machining away all material above the surface of the parts of the foil conforming to said wiring pattern.

3. The process set forth in claim 1 wherein said particles are spherical in shape.

4. The process set forth in claim 1 and comprising the additional step of pressing said particles into an oblate shape after they are bonded to the conductive material and before the insulating material is placed in contact with them, whereby said mechanical bond includes insulating material completely around and behind each oblate particle.

References Cited in the file of this patent

UNITED STATES PATENTS

| | | |
|---|---|---|
| 1,960,042 | Andrus | May 22, 1934 |
| 2,681,473 | Carlson | June 22, 1954 |
| 2,691,814 | Tait | Oct. 19, 1954 |
| 2,699,424 | Nieter | Jan. 11, 1955 |
| 2,716,268 | Steigerwalt | Aug. 30, 1955 |
| 2,724,177 | Coffman et al. | Nov. 22, 1955 |
| 2,762,116 | Rudner | Sept. 11, 1956 |

FOREIGN PATENTS

| | | |
|---|---|---|
| 605,145 | Great Britain | July 16, 1948 |